United States Patent

Hoppes

[15] 3,662,160

[45] May 9, 1972

[54] ARBITRARY FUNCTION GENERATOR

[72] Inventor: Ronald R. Hoppes, Royersford, Pa.

[73] Assignee: Weston Instrument, Inc., Newark, N.J.

[22] Filed: Jan. 11, 1971

[21] Appl. No.: 105,465

[52] U.S. Cl...........................235/150.53, 235/152, 235/197

[51] Int. Cl...........................................G06j 1/00, G06g 7/26

[58] Field of Search .................235/150.53, 150.5, 152, 197, 235/150.3; 328/114, 142; 340/347 DA

[56] References Cited

UNITED STATES PATENTS 3,373,273 3/1968 Schubert.......................235/150.53 X 3,480,767 11/1969 Howe...............................235/150.53

3,513,301 5/1970 Howe...............................235/150.53

3,557,347 1/1971 Robertson ........................235/150.53

*Primary Examiner*—Joseph F. Ruggiero

*Attorney*—William R. Sherman, Stewart F. Moore, Jerry M. Presson, Leonard R. Fellen and Roylance, Abrams, Berdo and Kaul

[57] ABSTRACT

A function generator is provided which accepts digital commands and produces a desired arbitrary function of time as a digital and analog output signal. The generated output functions are composed of sequentially connected linear ramp segments.

3 Claims, 14 Drawing Figures

TAPE PROGRAM FORMAT

| FUNCTION → | (% RANGE) AMPLITUDE | | | | (SECONDS) SEGMENT TIME | | | CYCLES GENERATED | | | | | | | | |
|---|---|---|---|---|---|---|---|---|---|---|---|---|---|---|---|---|
| CHARACTER → | 0 | 1 | 2 | 3 | 4 | 5 | 6 | 7 | 8 | 9 | 10 | 11 | 12 | 13 | 14 | 15 |
| PROGRAM STEP ↓ | (+) (−) | X10 | X1 | X1 | X10 | X1 | (X) $10^{-X}$ | $X10^3$ | $X10^2$ | X10 | X1 | $X10^3$ | $X10^2$ | $X10^1$ | X1 | |
| A | − | 4 | 0 | 0 | 0 | 1 | 0 | | | | | | | | | C/R |
| B | − | 5 | 0 | 0 | 0 | 1 | 0 | | | | | | | | | C/R |
| C | − | 4 | 0 | 0 | 0 | 1 | 0 | | | | | | | | | C/R |
| D | − | 4 | 0 | 0 | 0 | 3 | 0 | | | | | | | | | C/R |
| E | + | 6 | 0 | 0 | 0 | 2 | 0 | | | | | | | | | C/R |
| F | + | 8 | 0 | 0 | 0 | 2 | 0 | 0 | 0 | 0 | 3 | | | | | C/R |
| H | + | 6 | 0 | 0 | 6 | 5 | 1 | | | | | | | | | C/R |
| J | + | 0 | 0 | 0 | 1 | 5 | 1 | | | | | | | | | C/R |

INVENTOR.
Ronald R. Hoppes

BY Leonard R. Pellan

ATTORNEY

FIG. 5
| | END AROUND CARRY | DECADE CARRY | ADDER OUTPUT CODE |
|---|---|---|---|
| SUBTRACT | 0 | 0 | BCD 9's COMPLEMENT EXCESS 6 |
| | 0 | 1 | BCD 9's COMPLEMENT } DOES NOT OCCUR IN MOST SIGNIFICANT STAGE |
| | 1 | 0 | BCD EXCESS 6 } DOES NOT OCCUR IN MOST SIGNIFICANT STAGE |
| | 1 | 1 | BCD |
| ADD | 0 | 0 | BCD EXCESS 6 |
| | 0 | 1 | BCD |
FIG. 7
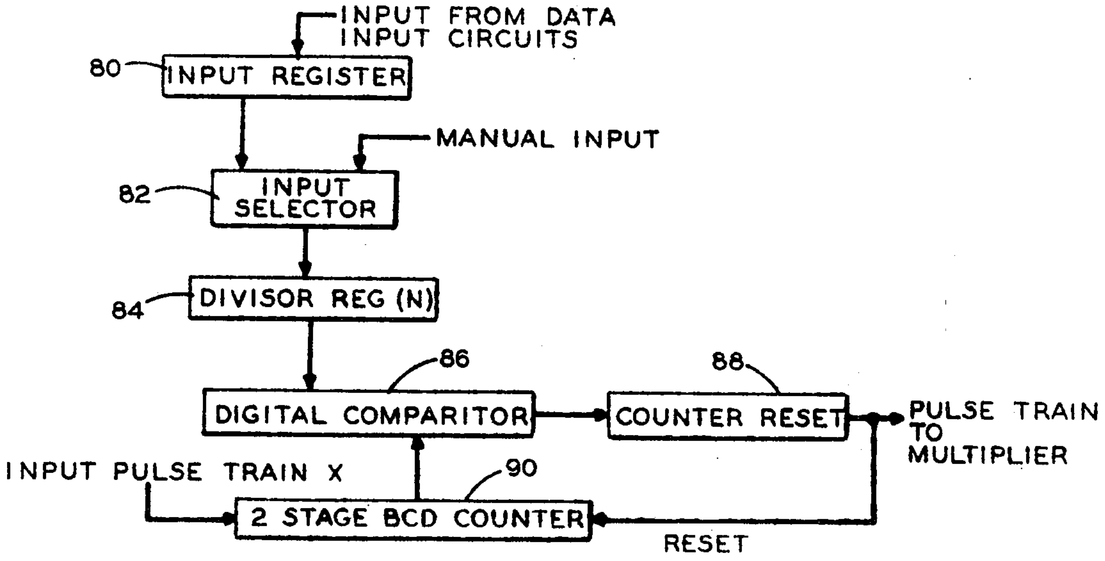
FIG. 8
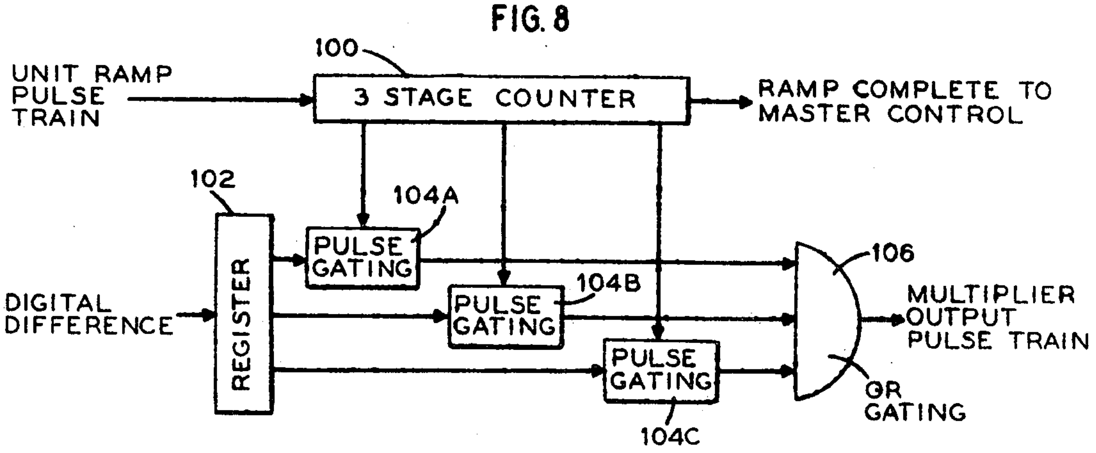

ARBITRARY FUNCTION GENERATOR

This invention relates to waveform synthesizers, and more particularly to apparatus for generating arbitrarily shaped waveforms or functions.

Heretofore known types of arbitrary function generators have included one in which the waveform desired was drawn on a conductive drum. A servo driven probe was arranged to follow the waveform as the drum was rotated. The probe was mechanically linked to an electrically energized potentiometer to produce an output voltage representative of the waveform scribed on the drum. Problems inherent in this type of system apparatus were the relatively low speed scanning limitations imposed by the mechanical components, drum size limitations as related to the waveforms to be scribed, the relative inaccuracy of the output signal as compared to the scribed waveform, as well as limitations on the range of frequencies obtainable with a given drum size.

Another known type of arbitrary function generator apparatus included means for recording the desired waveform during its natural occurrence in nature in analog form on a magnetic tape. The tape would then be played back whenever the waveform was desired to be reproduced. Drawbacks in this type of system apparatus are the relative difficulty in obtaining the desired waveform, the inability to halt the generator and examine specific levels (peaks, valleys, etc. ) of the waveform. Also, the accuracy is limited by the recorder response and the waveform cannot be easily modified.

It is an object of the present invention to provide a new and improved arbitrary waveform function generator having none of the above mentioned problems, drawbacks and difficulties.

It is another object of the invention to provide a function generator which utilizes digital techniques and is capable of creating a broad spectrum of arbitrary and periodic waveforms.

It is another object of the invention to provide an arbitrary function generator having greater accuracy and operable at higher speeds than has heretofore been provided by known prior art apparatus.

Briefly described the apparatus of the invention produces an output waveform signal of sequentially connected segments in response to a plurality of input data word signals, each data word signal representing the end point amplitude and time duration of a respective one of the sequentially connected segments. Means are provided for converting the separate data word signals into digital signals which are sequentially coupled to a digital subtraction means and a pulse generating means. The subtraction means acts on the end point value data portion of the digital data word signal to provide an algebraic subtraction from the end point value of a previously processed data word and then couples the resultant digital signal to a pulse rate multiplier means. The pulse generating means is responsive to the time duration data portion of the digital data word signal being processed to provide a pulse train output signal comprising a pre-determined number of pulses occuring during the time duration specified and which is then coupled to the pulse rate multiplier means. The output from the multiplier corresponds to the algebraic product of the two signals coupled thereto, and this product output signal is algebraically added to the end point digital value of the previously processed data word to provide a digital updating of the endpoint value during the specified time interval. The updated endpoint value is coupled to a digital to analog converter means to produce the analog ramp segment for the processed data word signal.

In accordance with a feature of the invention, cyclic waveforms may be provided from a single data word entry. In addition, a tape loop may be used to provide a repetitive arbitrary waveform.

In accordance with a further feature of the invention, means are provided for synchronizing the operation of two or more function generators of the invention

BRIEF DESCRIPTION OF THE DRAWINGS

FIGS. 4 and 5 are tables summarizing the decoding rules for the adder logic block section of the arithmetic unit;

FIG. 7 shows the various sections of the segment timer unit in block form;

FIG. 8 shows the various sections of the pulse rate multiplier unit in block form;

The function generator apparatus of the present invention is capable of creating a broad spectrum of arbitrary and periodic waveforms. The resultant output signal is a function of time, available simultaneously in both analog and digital forms. The output signal is created by digital commands read in one embodiment from a paper tape, or from an external digital data source, or by manual entry of data via front panel thumbwheel switches or the like on the apparatus.

The functions are composed of sequentially connected linear ramp segments. Each segment is defined by an endpoint and segment time. This information is read into the generator apparatus, which then interpolates between the previous endpoint, hereinafter referred to as the present value, and the new endpoint in the specified time interval. In this manner, arbitrary and/or cyclic waveforms may be generated by the apparatus. A tape loop may be used to feed data to the function generator apparatus to provide a repetitive arbitrary waveform.

Before detailing the component portions and operation of the function generator apparatus of the invention, a representative data program suitable for use with a preferred embodiment of the apparatus and incorporating the various features to which the apparatus responds will first be described.

ARBITRARY WAVEFORM AND PROGRAM DATA

Figures 1, 2:
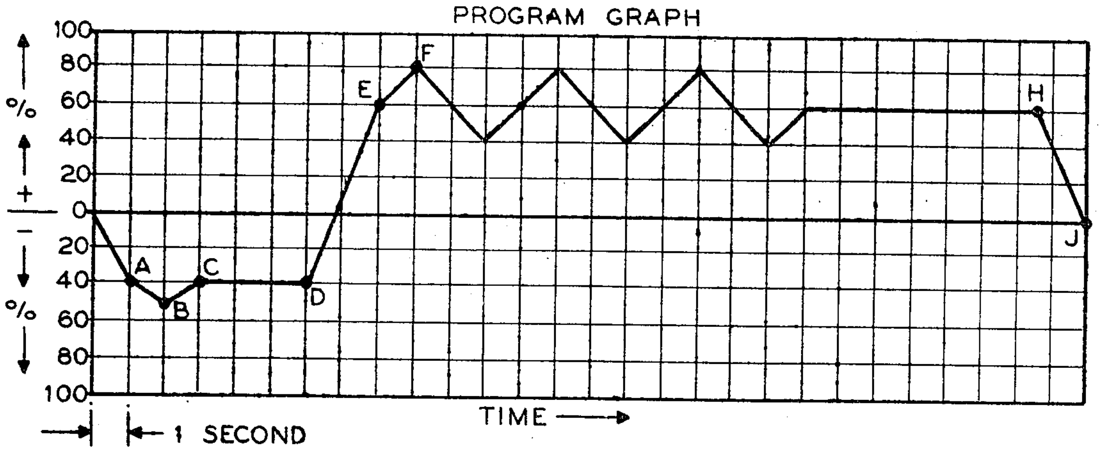
FIG. 1 illustrates an arbitrary waveform representative of the type that can be generated by the apparatus of the present invention.
FIG. 2 shows a program data chart for the waveform of FIG. 1.

Referring first to FIG. 1, there is illustrated an arbitrary waveform representative of the type that can be generated by the apparatus of the present invention. The waveform is drawn on a block or graph type paper with graduations in an "X" axis direction being scaled in unit intervals of time and graduations in a "Y" axis direction being scaled in a plus and minus percentage of the full scale output of the generator apparatus. FIG. 2 shows a sample chart on which data instructions for successive points A, B, C, D, etc. on the waveform of FIG. 2 have been entered in a format which will be acceptable as program data entries for the generator apparatus embodiment of FIG. 3. Each data entry or end point instruction corresponds to a separate program step. For each step, a data word comprising 11 characters and a data word completion character is formulated so as to provide instructions to the generator apparatus as to the amplitude (designated by the end point) and time of the waveform segment to be generated.

In accordance with special novel features of the generator apparatus of the invention, to be hereinafter described, the step data word may also include instructions for the generation of one or more waveform cycles having a peak amplitude equal to the end point data entry, The last data entry for each step in the chart, as for example, the "CR" notation, signifies the completion of a data word.

From an inspection of FIG. 1, it will be seen that the desired waveform starts at zero, and then decreases to an amplitude level of −40 percent of the generator output during a time interval of 1 second (point A). This comprises the first program step and is entered accordingly in the FIG. 2 chart. Character 0 indicates the amplitude polarity; characters 1, 2 and 3 indicate the amplitude range; and characters 4, 5 and 6 indicate the segment time. Data information for program steps B, C, D and E are similarly tabulated.

In step F, a block cycle mode of operation is called for as indicated by the number entry in the cycles generated character section of the FIG. 2 chart. In this example, 3 cycles are specified and therefore the 80 percent amplitude level noted corresponds to the peak amplitude of the first half cycle of the waveform. The time interval for this half cycle is 2 seconds and is so entered in the chart. Data for steps H and J are tabulated as above for step A.

Figure 3:
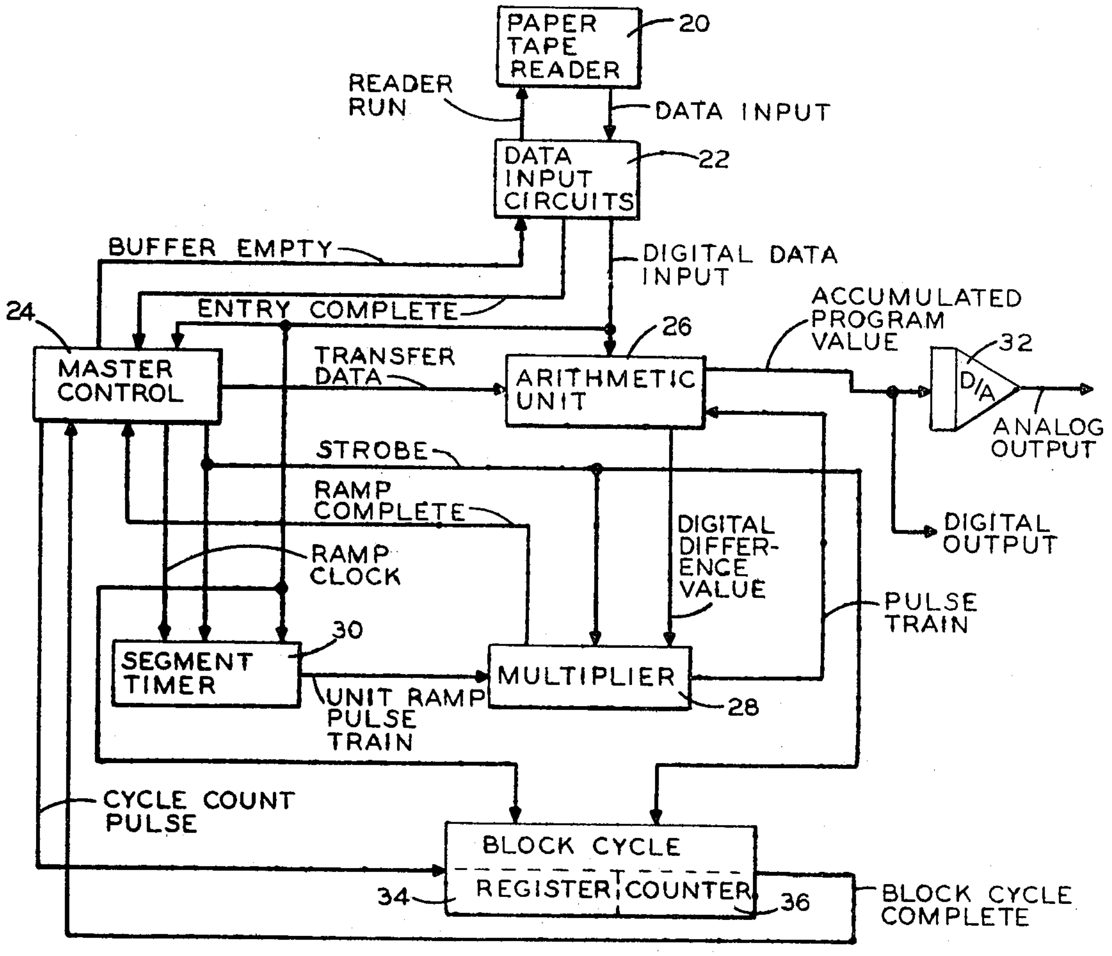
FIG. 3 is a simplified block diagram of a function generator embodying the present invention.

For use in a preferred embodiment of the invention as illustrated in FIG. 3, storage of the digital data words is on a paper tape punched in American Standard Code for Information Interchange (ASCII) code characters. Each character punch on the tape is comprised of eight bits. A teletype of a standard Bell System "TWX" type may be conveniently used in this application to punch the tape.

Referring again to the waveform program format of FIG. 2, the symbols used therein correspond to that which may be found on a standard teletypewriter for the generation of an ASCII encoded program tape and are defined as follows.

As was heretofore noted, the apparatus of the invention operates to generate waveforms by a series of connecting linear ramp segments. Each segment is defined by an endpoint, expressed in percent of programmable range, and desired segment time, expressed in seconds.

A block cycle mode of operation provides for the generation of cyclic waveforms. In this mode, the endpoint specifies the peak value of the first half cycle with the ramp time specifying the period of the first half cycle. As per the example of point F on the FIG. 1 waveform, the number of block cycles desired is entered in the character slots 7 through 10 of the program chart (FIG. 2, step F).

Numerical characters 0 through 9 and minus (−) are standard characters found on a teletypewriter. On the teletypewriter, a (+) sign in the "0" character column of the program chart is represented by the "space" key. The carriage return (CR) key signifies the end of a data word entry.

The function generator apparatus of the invention produces waveforms by connecting programmed points via linear ramps. The ramps are generated digitally and comprise successive discrete steps, each a preset percentage of the fullscale output of the apparatus. Utilizing a punched paper tape, the end point and ramp time are specified by 8 level ASCII characters placed in a format as described above.

GENERAL DESCRIPTION

Referring now to the simplified block diagram of FIG. 3, a photoelectric type paper tape reader 20 is provided for program entry. The reader 20 is responsive to a paper tape punched in ASCII code characters as was heretofore described, to provide a corresponding ASCII coded signal in an eight channel readout from the tape coupled to a data input circuit 22. The tape data specifies successive points on the waveform to be generated. When a carriage return (CR) character is read, i.e. the particular digital code combination which signifies the completion of a data word is read from the tape, the entry of data for that specific point is considered complete. This causes an entry complete signal to be coupled from the data input circuits 22 to a master control circuit means 24 signifying that information as to the next data point has been received. The data input circuits 22 function to convert the ASCII coded information signals to a binary coded decimal (BCD) signal and then channel the BCD signal to an arithmetic unit 26, segment timer 30 and block cycle unit for further processing of the BCD signal as will later be described in detail.

Briefly though, the arithmetic unit 26 accepts the data point information from the data input circuits 22 and on receipt of a transfer data signal from the master control means 24, the arithmetic unit 26 will read the next BCD data word. Following this, a signal indicating the transfer of the data to the arithmetic unit 26, is coupled via the master control means 24 through the data input circuits 22 to paper tape reader means 20. Data for the next end point entry will then be read from the reader 20 into appropriate registers via the input circuits 22.

In the arithmetic unit 26, the BCD data for the new end point is stored and the existing accumulated program value or old end point, hereinafter referred to as the present value, is algebraically subtracted from the new endpoint value. The resulting difference is entered into the multiplicand register of a digital pulse rate multiplier 28. This value or difference represents the Y axis change which is the number of discrete steps required to generate the next ramp.

The master control means 24 includes an oscillator circuit which provides a high frequency pulse train output reference clock signal to a segment timer circuit 30 for coupling to the pulse rate multiplier 28. At ramp time, i.e., the time that the segment of the new end point is to be generated, the Y axis change is multiplied by a standard unit ramp, i.e., a pulse train comprising a preset number of pulses, as for example 1,000 pulses, and which represents a zero to full scale change or a preset number of discrete steps, such that the multiplier output becomes a train of pulses representing the number of required increments (steps) necessary to ramp to the programmed endpoint. Note, each output pulse from the multiplier will correspond to a single discrete step.

As each of the pulses appear at the multiplier 28 output, they are coupled to a binary counter in the arithmetic unit 26 which is at the accumulated program value. The pulse feed to the binary counter operates to algebraically change the accumulated value. The pulse output of the multiplier is thus digitally added or subtracted, depending upon the sign of the algebraic subtraction, from the accumulated program value. The rate at which the pulse train is generated and thus added to the output is determined by the programmed segment time. Note, this segment time is specified with the endpoint value data. The binary counter or digital register in the arithmetic unit containing the actual program value is therefore an accumulation of all past segments and forms the base at the end of a segment on which the new segment change is constructed. The timing and operation of the arithmetic unit 26 is under the control of signals received from the master control unit 24 to be hereinafter described. The accumulated value in the arithmetic unit digital register is fed to an analog to digital converter means 32 where it is converted to an analog voltage output. A corresponding digital output signal is also available at an output of the arithmetic unit 26.

A block cycle feature of the function generator apparatus allows for the generation of a specific number of repetitive waveforms. In the block cycle mode, the segment data entry specifies the peak value and time duration of the first half cycle period of the cyclic waveform. In response to sensing data indicating a block cycle mode has been selected, the function generator apparatus will generate the first ramp, reverse its direction and generate two similar ramps, followed by another reversal and one ramp returning to the starting value. This will constitute one cycle. These steps will then be repeated until the number of cycles called for by the program data entry in the block cycle mode character slots has been generated. The ramps are generated in the arithmetic unit with the corresponding accumulated digital program values being fed to the digital to analog converter as before. The number of desired cycles is entered into a digital register 34 for the block cycle mode. A binary counter 36 is initially reset and then incremented at the completion of each cycle. When the value in the counter 36 is equivalent to the value in the register 34, the block cycle mode is terminated by a signal coupled to the block cycle control circuits in the master control means 24. The register 34 is automatically cleared by the next endpoint data entry. As long as the register remains cleared, single ramps are generated for each end point data entry. Entering a value into the register 34 other than zero will again cause the cyclic controls to be enabled.

ARITHMETIC UNIT

Figure 4:
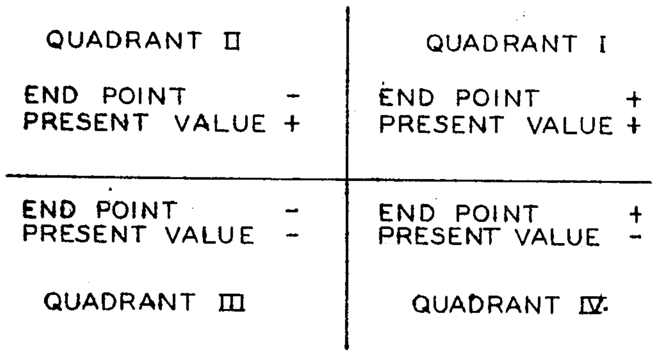
Figure 6:
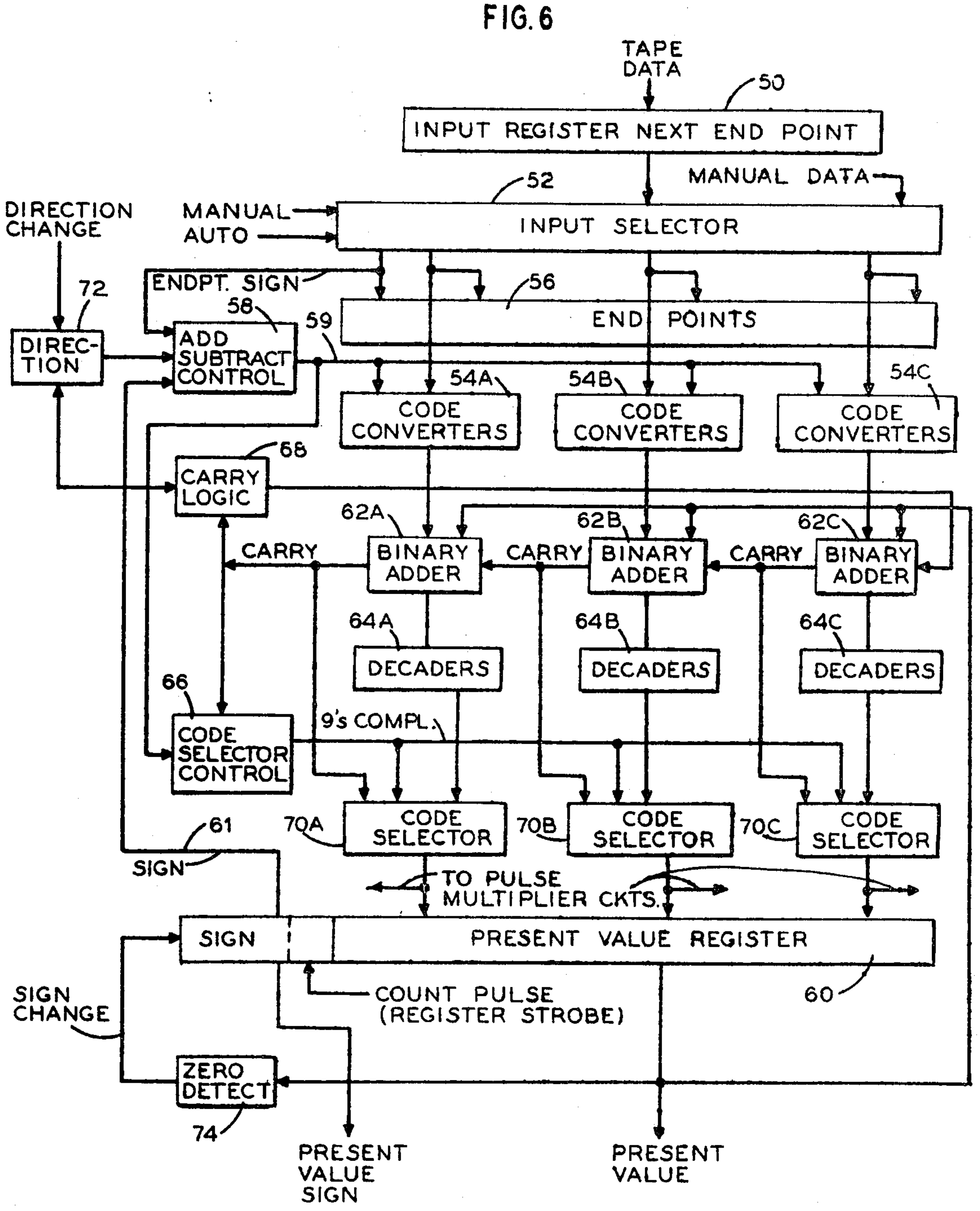
FIG. 6 shows the various sections of the arithmetic unit in block form.

A more detailed description and operation of the arithmetic unit 26 will now follow, with reference being had to FIGS. 4, 5, and 6.

The arithmetic unit comprises an endpoint register, adder, and present value register. The adder has two modes of operation.

1. It accepts BCD (binary coded decimal) inputs and provides a BCD output, which is the algebraic difference between the present output register value and the input value (next endpoint).
2. It accumulates the pulses which are supplied by the multiplier.

The adder circuits in essence form a four quadrant 9's complement excess six adder. The main portion of the adder comprises three, four bit binary full adders. One adder is used for each digit of the BCD number. When adding BCD values, a carry is required for results of 10 or greater per digit. However, four bit binary adders do not produce a carry until the result is 16 or greater. To overcome this problem, converter logic circuits are provided to add six to each digit of the BCD endpoint value before it is applied to the inputs of the binary adders (BCD excess six code). This allows the BCD value in the present value register, to be introduced directly into the adder without any code modifications. If the excess six is now removed from the result of the binary adders the result will be the BCD sum. Note, that as to the least significant digit, that the excess six has already been removed from any decade which produces a carry. However, the operation of the function generator apparatus requires not the sum but the difference between the accumulated value (present value register) and the next endpoint value. A set of rules are thus required to represent negative numbers. In the arithmetic unit a 9's complement code is used for this purpose. The 9's complement code is formed by subtracting each digit from the value 9 to allow addition with 4 bit binary adders. The same rules apply to the results as before, the excess six must be removed from the result of any stage which does not produce a carry. Also, if a carry is generated by the most significant decade "one" must be added to the least significant digit (end around carry). If an end around carry is not generated, the 9's complement of each digit must also be taken in addition to the removal of the excess six. Note that the 9's complement excess six code is the 1 's complement of the BCD code. Note also that for the most significant digit (decade) only, the first or last state occurs since the decade carry is also the end around carry.

The principles described thus far consider the difference between two values in either the first or third quadrant (signs of both values the same). The adder must also operate in the second and fourth quadrants (signs different) where the difference between the two values is the sum, see FIG. 4. This sum could be, for example, as large as 1,998 (endpoint −999, present value +999 ) where the carry of the most significant decade indicates the sum is 1,000 or greater. Thus the end around carry must be disabled during addition. FIG. 5 summarizes the adder output decoding rules.

FIG. 6 illustrates the various sections of the arithmetic unit in block form. At the top of the figure is the input register 50, into which the polarity sign and three BCD data characters corresponding to the next endpoing value are strobed one at a time from the tape data input circuits 22. The contents of this register 50 or a manual BCD entry or external source BCD data input is selected by the input selector control logic means 52 and applied to code converter circuits 54A, 54B, 54C and an endpoint register 56. The code converters perform a 9's complement excess six (1's complement) for a subtraction, or an excess six conversion for an add. An add/subtract control logic means 58 determines which is to be performed by examining the signs of the new end point and the present value. The code converter outputs are summed with the contents of the present value register 60 in three binary adders 62A, 62B and 62C with the result being applied to a set of decoders 64A, 64B and 64C. These decoders provide code conversions as determined by the code selector control 66 and carry control 68 logic circuits (see FIG. 5), and feed output signals to respective code selectors 70A, 70B, and 70C. The code selector 70 outputs are applied to both the present value register 60, which is not strobed at this time, and the pulse multiplier unit 28 (see FIG. 3) into which the value is strobed. This pulse multiplier value input is the required number of increments (steps) necessary to ramp to the programmed endpoint.

Binary adders 62A, 62B, and 62C effectively operate as one 12 bit adder and have interconnections therebetween for the carry bit. The carry bit signal from the most significant stage is coupled to the carry logic circuits 68 which provides an end around carry bit signal to the least significant stage when a subtraction operation signal is received from the add/subtract control 58.

After the multiplier value is determined at the output of the code selectors 70, both the Manual and Auto enable lines of the input selector 52 are disabled. The selector 52 logic is so designed that when neither input is selected, its input value is 0000 0000 0001. Thus, by means of the add/subtract control line 59, "one" may be added or subtracted from the present value. If this result is strobed into the present value output register 60, the present value will increase by one for an add state of line 59, or decrease by one for a subtract state of line 59, and a new result will appear. Thus the present value output register 60 will appear to count each time it is strobed. If the present value is to be ramped 20 increments, for example, the pulse multiplier will produce 20 count pulses (strobes) causing the output register 60 to ramp 20 steps. As noted above, the direction of the count is determined by the line 59 from the add/subtract control logic 58 which examines the sign of the output register and the state of a flip-flop in a direction control circuit 72. The polarity sign of the output is changed when ramping through zero by a zero detect circuit 74 which senses the zero crossing and provides an output signal to the present value register 60 to change the state of a "sign" flip-flop therein. This change of "sign" state is then coupled via line 61 to the add/subtract control logic 58 to change the add/subtract made of the arithmetic unit.

The direction flip-flop circuit 72 is preset when the multiplier value is determined, and thereby determines the direction of the initial ramp. The state of this flip-flop may be changed at any time causing the count to reverse direction. It is this feature which reverses the count to produce the cyclic output in the block cycle mode.

SEGMENT TIMER

The segment timer 30 will now be described with reference to FIG. 7.

The segment timer circuits include an input eight bit register 80, input selector means 82, eight bit divisor register 84, digital comparitor means 86, counter reset circuit means 88, and a two stage BCD counter 90.

The segment timing data from the tape data word entry is coupled from the data input circuits 22 (FIG. 3) to the input register 80, where it is stored until transferred to the divisor register 84. This input data in register 84 is the divisor N to be coupled to the digital comparator 86. The input selector 82 allows either the tape data input or manual data to be entered into the divisor register. Transfer occurs simultaneously with the storage of the digital difference information into the multiplier 28 (FIG. 3).

The counter 90 accepts a pulse train X or ramp clock from the master control 24 (FIG. 3). The output of the counter is coupled to the digital comparitor 86 which also receives the output from the divisor register 84. The input pulse train advances the counter 90 which begins from the reset or zero state and counts up. When the counter value is equal to the divisor N as determined by the digital comparator 86, the counter reset circuit clears the BCD counter. The output of the counter reset circuit 88 is the desired pulse train X/N which is coupled to the multiplier 28 (FIG. 3).

PULSE RATE MULTIPLIER

Referring now to FIG. 8 the multiplier shown therein includes a three stage BCD counter 100, a 12 bit binary storage register 102, pulse gating circuits 104A, 104B, 104C, and an output "OR" gate, circuit 106.

The unit ramp pulse train output from the segment timer is applied to the counter 100, which provides an output ramp complete signal to the master control means 24 for every 1,000 pulse counts.

The digital difference value from the arithmetic unit 26 is stored in register 102. Register 102 thereby contains three digits coded in BCD. An output for each of the digits stored in the register 102 is respectively coupled to pulse gating circuits 104A, 104B and 104C. Pulse gates 104 are enabled by the state of the logic in register 102, and sense the count pulses in counter 100 to provide pulse output signals to the "OR" gate 106 such that the number of output pulses coupled through the "OR" gate 106 during a 1,000 pulse count by the counter 100 is equal to the value contained in register 102. These output pulses from the "OR" gate 106 comprise the pulse train output which is fed back to the arithmetic unit 26 for generating the ramp segments as was heretofore described.

MASTER CONTROL

Figure 9:
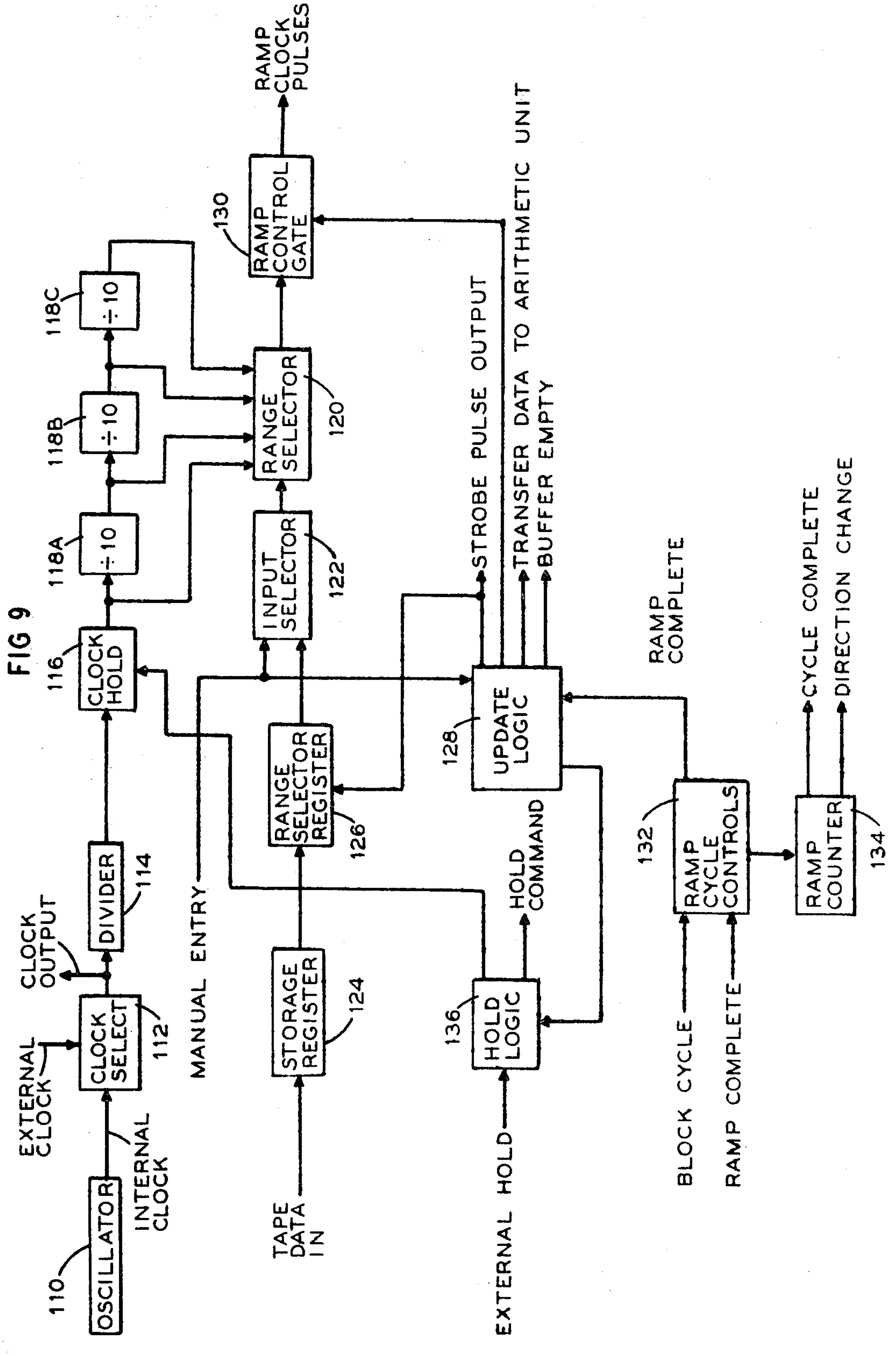
FIG. 9 shows the various sections of the master control unit in block form.

The master control unit 24 provides for endpoint updating, ramp generation, block cycle generation, ramp time range, and a hold feature for the function generator apparatus. A block diagram of these controls appears in FIG. 9.

The basic timing reference is a crystal controlled oscillator 110, operating for example, at 6 MHz. A clock select circuit 112 provides for the selection of an internal or external oscillator reference signal. A divider 114 may be provided to reduce the clock rate to a value desired for the maximum ramp rate of the apparatus.

The divider 114 output is coupled through a clock hold gating circuit 116 to the input of one of three divide by 10 circuits 118A, 118B, and 118C. Thus, four different clock rates are available, i.e. the input rate to the first divider 118A, and the three outputs from the dividers 118. The clock outputs are coupled to a range selector gate switch 120 which is responsive to a selection signal from an input selector 122 to gate out the desired clock rate signal.

Figure 10:
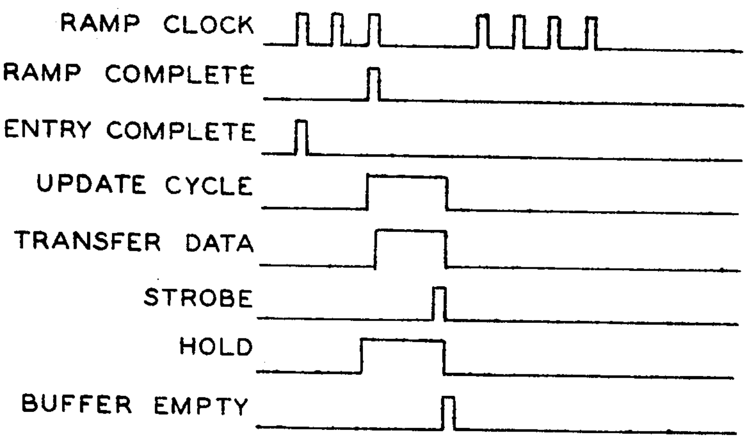
FIG. 10 is a relative waveform timing diagram for the update logic block shown in FIG. 9.

The desired clock rate range is contained in the character 7 slot in the data word read from the paper tape and processed through the data input circuits 22 (FIG. 3) to a two bit storage register 124 in the master control unit. Data from the register 124 is coupled to a range selection register 126 upon the occurrence of a strobe signal from an update logic circuit 128. The selected clock rate output from range selector 120 is coupled to a ramp control gate 130. The ramp clock pulse output from the gate 130 is controlled by the update logic circuit 128. Logic circuit 128 operates to provide a signal to control gate 130 to interrupt the ramp clock pulse output therefrom during the time interval that the digital difference value is being determined in the arithmetic unit. Upon the receipt of ramp complete and entry complete pulses from the multiplier unit 28, and data input circuits 22, the update logic 128 couples a transfer data signal to the arithmetic unit for updating the endpoint data stored therein. The update logic 128 also provides a strobe timing pulse signal to the data storage registers in the multiplier unit, segment timer, and block cycle unit to cause new data entry. Upon completion of this new data entry timing sequence, the update logic provides a buffer empty signal to the data input circuits 22. A relative waveform timing diagram for the update logic circuit 128 is shown in FIG. 10.

Figure 11:
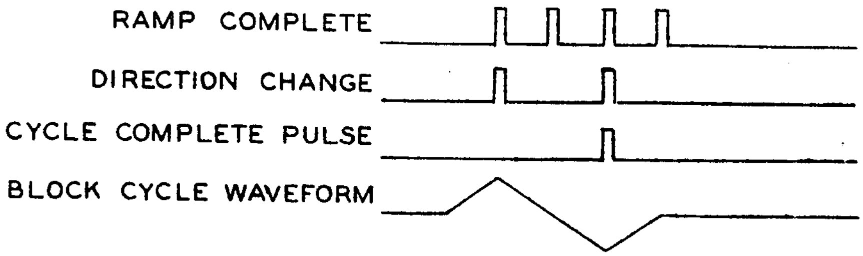
FIG. 11 is a relative waveform timing diagram for the ramp/cycle control logic and ramp counter shown in FIG. 9.
Figure 12:
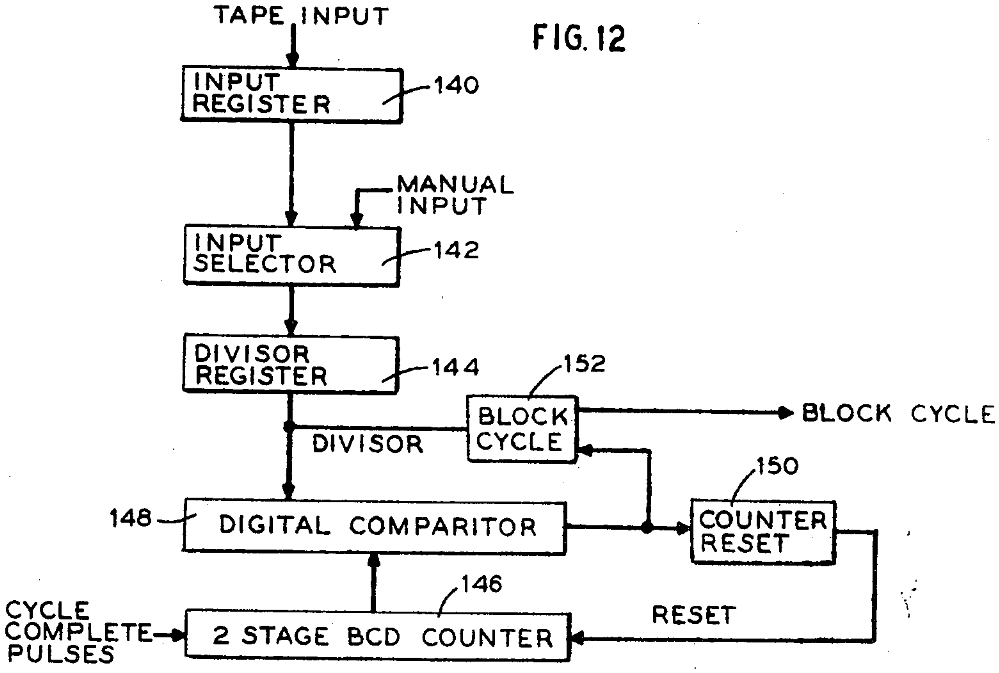
FIG. 12 shows the various sections of the block cycle unit in block form.

The master control means 24 also includes a ramp cycle control logic circuit 132 and a ramp counter 134. The ramp cycle control logic functions to block the passage of the ramp complete pulse to the update logic circuit during block cycle operation of the function generator apparatus and instead channel the ramp complete pulse to the ramp cycle counter circuit 134. It will be noted that for block cycle operation, four ramps are generated during one block cycle. For every four ramp complete pulses sensed by the counter circuit 134, one cycle complete pulse is generated at an output of the counter which is then coupled to the block cycle unit to be hereinafter described. Also, a direction change pulse signal is provided at an output of the ramp counter at the completion of the first and third ramps during a block cycle operation. Relative waveform timing diagrams for the ramp/cycle control logic and ramp counter are shown in FIG. 11.

Input connection circuit means to the update logic circuit 128 and input selector 122 are also provided for manual entry of range selection data to override the tape data entry. The master control also includes a hold logic circuit 136 which is responsive to an externally applied signal to inhibit the clock pulse feed from divider 114. In addition, during the data transfer to the arithmetic unit, the update logic control provides a signal to the hold logic 136 which in response thereto, produces an output hold command signal therefrom. This hold command signal is required for synchronizing the operation of two or more function generators as will later be described.

BLOCK CYCLE UNIT

The block cycle unit includes an input register 140 which receives BCD information from the data input circuits 22 indicating either the number of cycles to be generated or with a zero BCD data entry, that a block cycle mode has not been specified. An input selector 142 allows either the BCD input from register 140 or a manual block cycle data entry to be entered into a divisor register 144.

Cycle complete pulses from the ramp counter 134 (FIG. 9) advance a BCD counter 146 which begins from the reset state and counts up. When the counter 146 value is equal to the divisor value from register 144 as determined by a digital comparitor 148, the counter reset circuit 150 clears the BCD counter.

A block cycle logic circuit 152 is responsive to the output from the divisor register 144 to provide an output block cycle signal level for coupling to the ramp cycle control 132 (FIG. 9) when the data in the divisor register is read as other than zero. This signal level available at the output of the block cycle logic 152 remains until the count in the counter 146 is equal to the BCD value in register 144, after which the block cycle logic is cleared, terminating the block cycle mode.

DATA INPUT CIRCUITS

Figure 13:
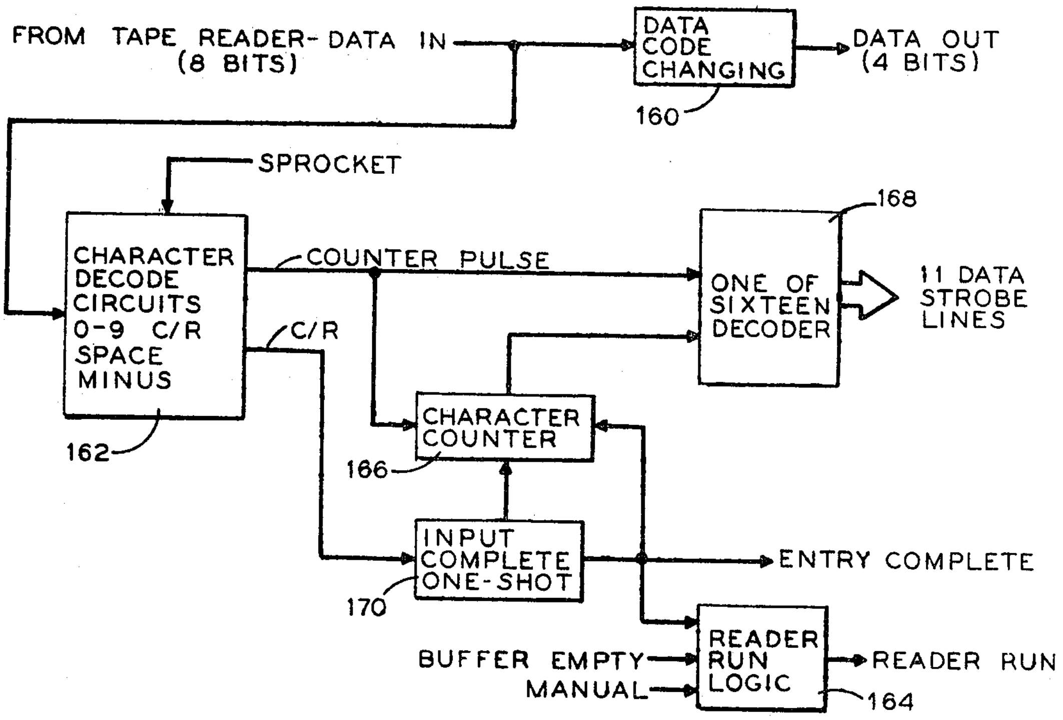
FIG. 13 shows the various sections of the data input circuits in block form.

The data input circuit portion of the function generator is illustrated in block form in FIG. 13. The data input from the tape reader is coupled to a data code changing means 160 and to a character decode circuit means 162. Energization of the reader for running of the tape is controlled by a run and inhibit run logic control means 164. In response to a buffer empty signal coupled from the master control 24, the logic means 164 provides an output signal to the paper tape reader 20 for enabling the reader to read the next data entry from the paper tape. On receipt of data entry complete signal, the logic means 164 inhibits the reader run signal so as to stop the tape reader. During the manual entry of data, the logic means further inhibits the coupling of a reader run signal to the tape reader.

The code changer 160 is a logic circuit which functions to convert an incoming ASCII encoded data signal into a corresponding output BCD data signal.

The character decode means 162 is a logic circuit which examines the incoming ASCII data signal to detect digits 0 through 9, space, minus, and carriage return notations. Note, it will be remembered that this is the keyboard nomenclature of a teletypewriter used to punch the ASCII coded tape and thereby provides the proper digitally coded signals to which the tape data control section of the apparatus is responsive. A pulse signal output is generated upon detection of characters 0 through 9 which is then fed to a character counter 166. The character counter, which is a four bit binary counter receives the input ASCII signal, and is advanced one count upon receipt of the pulse signal output of the character decode means which is generated for characters 0 through 9, space and minus. Thus, the four bit counter 166 provides up to 16 different output digital signal combinations as it is strobed. The character decode logic 162 advances or strobes the binary counter upon detection of characters 0 through 9, space, and minus data signals. Each time one of these characters is read from the tape, the counter 166 is advanced one count. The output of the counter 166 is coupled to a decoder circuit 168. Decoder 168 functions to channel or provide a separate output terminal for each of the 16 different digital signals available from the counter 166. It will be understood that only one digital output signal is available from the counter for each strobing of the counter. The output of the decoder 168 comprises 11 sequentially occurring strobes for enabling the buffer registers in the arithmetic unit, segment timer, later to be described to store the block cycle unit and master control means to receive and store appropriate portions of the BCD data word entry output of the code changing means 160. Note, the 12 through 16 output terminals normally available in a 16 line decoder are not utilized with the ASCII coded data signals in this embodiment as described. As was noted, the code changer 160 operates to convert the received input ASCII coded data signal to a BCD signal and may comprise logic circuits to formulate a BCD output in response to an ASCII input. Thus, 0 through 9 ASCII encoded signals are converted in the code changer 160 to corresponding 0 through 9 BCD signals. Logic is also provided for converting the "space" and "minus" ASCII to a data signal corresponding respectively to a "one" and "zero" BCD code combination. The converted BCD signal is then further processed in the arithmetic unit, block signal unit, segment timer, and master control unit as has heretofore been described.

A pulse signal output from the character decode circuits 162 corresponding to the occurrence of a "C/R" data notation from the tape is coupled to the input of a "one shot" multivibrator 170, which in response thereto provides an entry complete or reset pulse to the reader run logic 164, the character counter 166, and master control unit 24 (FIG. 3).

The 11 sequential output strobe pulses from the decoder 168 are channelled to the other portions of the generator apparatus as follows.

In the arithmetic unit the BCD data is entered in the input register 50 upon occurrence of the first four strobe pulses from the decoder 168. The BCD data thus stored in the register 50 corresponds to the data values for the next end point.

The next two strobes from the decoder 168 enable the input register 80 in the segment timer for entry of the BCD signal corresponds to the next segment time data value.

The next strobe enables the range storage register 124 inputs in the master control unit for entry of the BCD signal corresponding to the multiplier value for the segment time.

The next four strobes are channelled to the input register 140 in the block cycle unit for entry of the BCD signal corresponding to the block cycle count or the number of cycles to be generated for the particular point value being entered.

SYNCHRONIZING FEATURE

In accordance with a feature of the apparatus of the present invention, two or more waveform generators may be connected to operate in synchronism with one another as will now be described.

Figure 14:
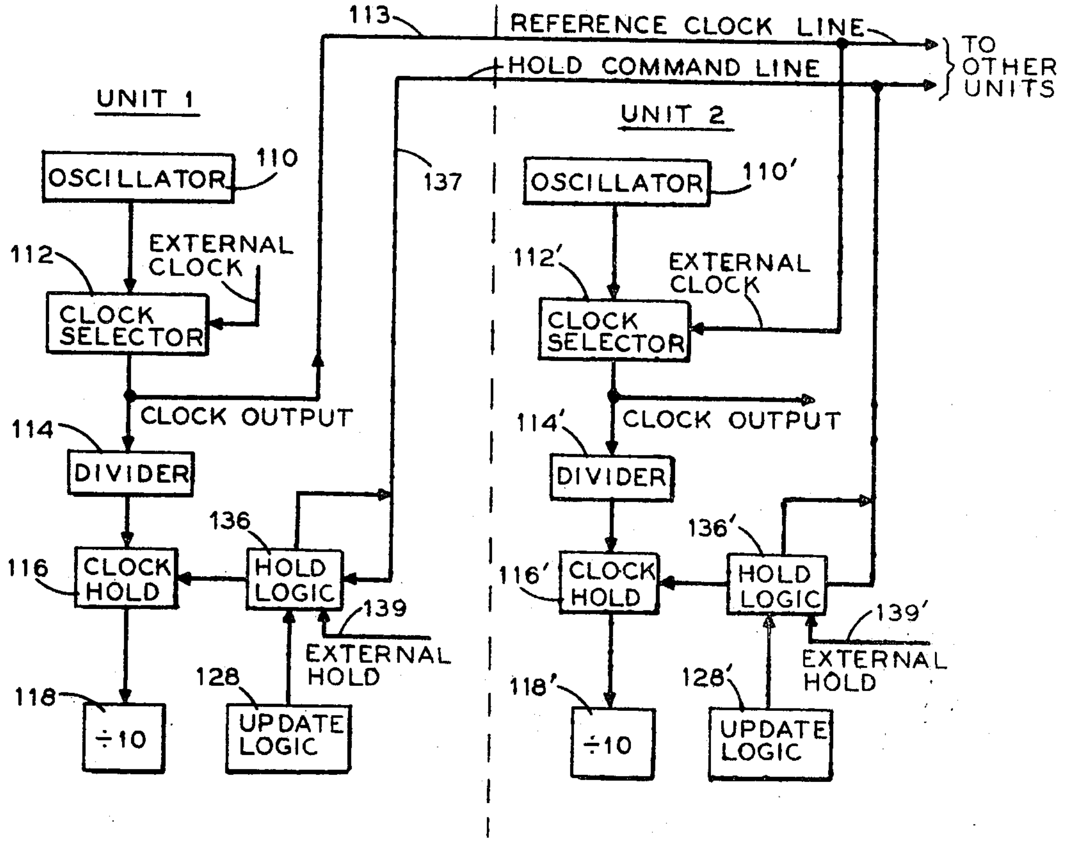
FIG. 14 is a block diagram illustrating the inter-connections between the master control sections of two function generators to provide for synchronized operation.

In FIG. 14, portions of the master control units of two similar function generators embodying the present invention are illustrated. The corresponding portions of the second generator (unit 2) is designated with a prime notation.

First the internal clock of one unit, as for example, unit 1, is chosen as a common clock for all other generators to by synchronized. The other generators are therefore required to use an external clock source which will be synchronized via a clock line coupling 113 to the reference clock. In this manner, all the function generators will have a common clock rate which is synchronized.

Second, the hold command line output from the hold logic circuit 136 is connected via lead 137 to the hold command line output of the other generators. To provide a means for sensing the state or the presence of a signal on the hold line 137, an input connection form the hold line 137 is also made to the hold logic 136.

The hold logic circuit 136 operates to generate a hold command output signal to each of the other generator units (Unit 2) in response to a signal received from the update logic 128 in one of the generator units (Unit 1) indicating that a ramp segment is not in the process of being generated in that one unit. It will be remembered that the update logic circuit 128 normally operates to provide a signal output to the ramp control gate 130 to inhibit the clock pulse output therefrom during the time interval that the digital difference value is being determined in the arithmetic unit. During this time interval a corresponding signal is sent to the hold logic 136 (Unit 1) to cause the hold command signal to be generated. Upon receipt of the hold command signal by the non-initiating generator units, (Unit 2) the hold logic circuits 136′ in these non-initiation units operate to provide an output signal to the clock hold logic block 116′ to inhibit or halt the coupling therethrough of clock pulses from the divider 114′.

Similarly, when one of the other generator units (Unit 2) is having a BCD data transfer, a hold command signal is also placed on the line 137 to cause the hold logic 136 (Unit1) in the one generator to inhibit the coupling of the clock pulses from the divider 114. Thus, when one generator unit is in the update phase, i.e. having a BCD data transfer, the other synchronized units are not in a segment generation state of operation.

The hold logic 136 is also responsive to an externally applied signal via an external hold input line 139 to generate a hold signal on the line 137. This provides an external source means for simultaneously stopping all the generators, regardless of the data transfer or cycle state they may be in.

While a thorough description of the function generator of the invention apparatus has been provided herein, further details as to specific logic circuits that may be used to construct the component portions of the apparatus may be had by referring to the following publications available from EMR Instruments Division of Weston Instruments, Inc., County Line Road, Hatboro, Pa., 19040.

1. EMR INSTRUMENTS 1641/1642 Profiler Instruction Manual Series A
2. 1641/1642 INSTRUCTION MANUAL Section 6— Circuit Diagrams Series A

What is claimed is:

1. Apparatus for generating a waveform signal of sequentially connected segments in response to a plurality of input data word signals, each data word signal representing the end point amplitude and time duration of a respective one of said sequentially connected segments, comprising:

input circuit means responsive to a control signal for enabling the entry of said data word signals for processing in said apparatus one word at a time, said input circuit means being operative on a data word entry to provide a corresponding digital output signal;

first and second data storage means for storing digital data values corresponding respectively to the end point amplitude of a previously processed data word and a new data word entry;

means coupling said digital output signal information corresponding to the end point amplitude of said new data word entry to said second data storage means;

subtraction means coupled to said first and second storage means for subtracting the digital data value stored in said second storage means from a data value stored in said first storage means;

pulse generating means responsive to the digital output signal information corresponding to the time duration of the end point segment for said new data word entry for providing a pulse train output signal comprising a predetermined number of pulses occurring during the time interval specified by said segment time data;

pulse rate multiplier means responsive to the pulse train signal output from said pulse generating means and the digital difference signal output from said subtraction means for providing an output pulse train signal corresponding to the algebraic product of these two signals;

means for algebraically adding the product output signal of said multiplier means to the digital data value stored in said first storage means so as to provide an updating of the digital value in said first storage means during the time duration of said product output signal;

converter means responsive to a digital input signal for providing a corresponding analog output signal; and means coupling a digital signal output from said first storage means equal to the value of the data signal stored therein to said converter means to provide an output segment signal corresponding to the end point amplitude and segment time duration of said data word being processed.

2. Apparatus as defined in claim 1 and further including:

control means having signal coupling paths to each of said input circuit means, subtraction means, pulse generating means, and multiplier means for enabling the operations performed therein.

3. Apparatus as defined in claim 2 wherein said input data word signal includes information specifying a number of cyclic waveforms to be generated with the end point amplitude of a data word representing a half cycle peak value of the cyclic waveform and further including:

means responsive to said cyclic waveform information for providing a signal to said control means indicating that cyclic waveforms are to be generated using the end point data as a half cycle peak value and inhibiting the coupling of the next data word signal to said input circuit means during the generation by the apparatus of the specified number of cycles.

* * * * *